United States Patent [19]

Suzuki

[11] Patent Number: 5,581,770
[45] Date of Patent: Dec. 3, 1996

[54] FLOATING INTERRUPTION HANDLING SYSTEM AND METHOD

[75] Inventor: Toshiaki Suzuki, Kanagawa, Japan

[73] Assignee: Mitsubishi Denki Kabushiki Kaisha, Tokyo, Japan

[21] Appl. No.: 46,029

[22] Filed: Apr. 12, 1993

[30] Foreign Application Priority Data

Jun. 4, 1992 [JP] Japan ................... 4-144370

[51] Int. Cl.$^6$ .................................................. G06F 13/00
[52] U.S. Cl. .................... 395/733; 395/741; 395/727
[58] Field of Search ........................... 395/725, 325, 395/275, 733, 734, 735, 737, 868, 727

[56] References Cited

U.S. PATENT DOCUMENTS

| | | | |
|---|---|---|---|
| 3,881,174 | 4/1975 | Barnich | 395/725 |
| 4,268,904 | 5/1981 | Suzuki et al. | 395/725 |
| 4,271,468 | 6/1981 | Christensen et al. | 395/725 |
| 4,302,808 | 11/1981 | Zanchi et al. | 395/725 |
| 4,342,995 | 8/1982 | Shima | 340/825.5 |
| 4,404,628 | 9/1983 | Angelo | 395/725 |
| 4,408,300 | 10/1983 | Shima | 395/200.06 |
| 4,482,954 | 11/1984 | Vrielink et al. | 395/725 |
| 4,495,569 | 6/1985 | Kagawa | 395/725 |
| 4,604,500 | 8/1986 | Brown et al. | 179/18 ES |
| 4,644,462 | 2/1987 | Matsubara | 395/868 |
| 4,644,465 | 2/1987 | Imamura | 395/725 |
| 4,796,176 | 1/1989 | D'Amico et al. | 395/725 |
| 4,833,598 | 5/1989 | Imamura et al. | 395/725 |
| 4,862,354 | 8/1989 | Fiacconi et al. | 395/325 |
| 4,930,070 | 5/1990 | Yonekura et al. | 395/725 |
| 4,953,072 | 8/1990 | Williams | 395/725 |
| 4,959,781 | 9/1990 | Rubinstein et al. | 395/735 |
| 5,038,274 | 8/1991 | Nielsen | 395/301 |
| 5,043,882 | 8/1991 | Ikeno | 395/725 |
| 5,058,051 | 10/1991 | Brooks | 395/494 |
| 5,125,093 | 6/1992 | McFarland | 395/725 |
| 5,146,597 | 9/1992 | Williams | 395/725 |
| 5,242,685 | 9/1993 | Landry et al. | 395/725 |
| 5,269,005 | 12/1993 | Heil et al. | 395/275 |
| 5,280,628 | 1/1994 | Nakayama | 395/725 |
| 5,283,904 | 2/1994 | Carson et al. | 395/725 |
| 5,297,290 | 5/1994 | Masui et al. | 395/725 |
| 5,317,747 | 5/1994 | Mochida et al. | 395/725 |
| 5,321,818 | 6/1994 | Wendling et al. | 395/325 |
| 5,379,434 | 1/1995 | DiBrino | 395/725 |
| 5,381,541 | 1/1995 | Begun et al. | 395/500 |
| 5,404,535 | 4/1995 | Barlow et al. | 395/725 |
| 5,410,709 | 4/1995 | Yu | 395/725 |

OTHER PUBLICATIONS

Futurebus & Logical Layer Specifications, Dec. 8, 1989.

*Primary Examiner*—Ayaz R. Sheikh
*Attorney, Agent, or Firm*—Wolf, Greenfield & Sacks, P.C.

[57] ABSTRACT

A system and method for handling a floating interruption in a time-saving way and for minimizing the number of signal pins in a multiprocessor system. An interruption is processed in a multiprocessor system including separate FINT line, Control Bus and Data Bus, as well as common ITC. The FINT line transfers a floating interruption request from the ITC to all the processors. The Control Bus transfers an acknowledgement notification of a floating interruption. The Data Bus transfers additional information related to a floating interruption request. A processor 1' starts an acknowledgement and notification process corresponding to its internal state, i.e., a processor in a wait as well as an acknowledgement status for an interruption starts an acknowledgement process for the interruption instantly, while a busy processor delays the process for a given unique cycle and starts the process when it goes to its acknowledgement status.

42 Claims, 6 Drawing Sheets

FLOATING INTERRUPTION HANDLING SYSTEM AND METHOD

BACKGROUND OF THE INVENTION

1. Field of the Invention

The present invention relates to the system and method for handling a floating interruption in a information processing system with a multiprocessor configuration.

2. Description of the Related Art

FIG. 7 shows a conventional multiprocessor system configuration and is an example of a multiprocessor system configuration based on Futurebus+ prescribed by IEEE standard P896.1. FIG. 8 shows a conventional floating interruption handling system in a multiprocessor system.

Referring to FIG. 7, each processor 1 performs data processing and interruption handling. A main memory 2, storing instruction codes and data, can be shared by all the processors in the system. An external interruption controller 3 (which will be called an "ITC" hereinafter) issues a floating interruption request for all the processors. ITC 3 also issues additional information related to the request in response to a floating interruption acknowledgement notification by a processor 1. ITC 3 then clears the floating interruption request to be acknowledged by a processor 1, as part of a process of a floating interruption handling. A set of communication lines called common control lines 4 (which will be called a "Control Bus" hereinafter) transfer control information between the main memory 2 and a processor 1. Control Bus 4 also transfers control information of a floating interruption request from ITC 3 and of an acknowledgement notification of an interruption from a processor 1. A set of communication lines called common data lines 5 (which will be called a "Data Bus" hereinafter) transfer information between a processor 1 and the main memory 2. Data Bus 5 also transfers additional information related to a floating interruption request from ITC 3 in response to a floating interruption acknowledgement notification from a processor 1.

FIG. 8 shows a multiprocessor system configuration with floating interruption request lines individually and independently provided between a processor 1 and ITC 3. The numerals 1 to 5 in the figure correspond to those in FIG. 7.

A floating interruption handling system utilizes a generally known method of load-equalization among processors. It provides a high overall system efficiency in terms of throughput in a symmetrical-type multiprocessor system. This method adopts a priority scheme in which only one processor may announce the start of a floating interruption acknowledgement process in response to an interruption request from an Input/Output device. For instance, only if that one processor issues the announcement before any other processors, it can follow a floating interruption handling routine further.

The conventional floating interruption handling system will now be described with reference to FIG. 7. The process begins with an interruption request being issued by one or more Input/Output devices. The request is sent to the ITC 3 by the source or device via an interruption line (not shown). After identifying a floating interruption source, ITC 3 tries to gain the priority of exclusive access to Control Bus 4 and Data Bus 5 through use of a conventional bus arbitration technique. The conventional bus arbitration system or technique will not be discussed here since it is well known and is not essential to the present invention. When exclusive access is obtained, ITC 3 broadcasts a floating interruption request on Control Bus 4 and Data Bus 5 to all the processors in the system. When an interruption request signal on Control Bus 4 is detected by each processor 1, it processes the signal as a floating interruption request.

When the request is recognized by processor 1, it initially examines an internal condition for acknowledgement, for example, by the state of an interruption mask. When a processor 1 is determined to be in an "enabled state" after examination through the mask, it starts an acknowledgement process. When a processor 1 is determined to be in a "disabled state", it suspends the initiation of the acknowledgement process for a certain period and maintains such suspension until the condition changes to an "enabled state".

In accordance with the priority scheme implemented in the floating interruption handling method, a processor 1 which starts an acknowledgement process prior to others will initially follow an exclusive routine by announcing its start of an acknowledgement process on Control Bus 4. Upon receipt of such announcement, the other processors cancel their own internal acknowledgement processes, if such process is starting or pending. Here, however, there occurs a potential conflicting event. Specifically, two or more processors may start an acknowledgement process simultaneously when they detect a floating interruption request. They may, thereafter, try to issue a starting announcement simultaneously and spontaneously on Control Bus 4. This problem is caused where every processor 1 has an equal access to signals carried on the buses. A proposed solution is to implement a bus arbitration system which can decide which device in a system has priority in getting exclusive access to the buses. In this case, for instance, the system would determine which processor should use Control Bus 4. To be more specific, only one of processors can gain the priority of exclusive access to Control Bus 4 prior to others through a bus arbitration technique in which the processor 1 broadcasts its acknowledgement of a floating interruption on Control Bus 4. In response to the announcement, all the other processors, even those which tried to issue a starting announcement simultaneously, cancel their internal operations for the acknowledgement of a floating interruption, if executing or pending.

Following the starting announcement of a floating interruption acknowledgement process on the bus, the processor 1 provides its acknowledgement of a floating interruption to ITC 3 on Control Bus 4. In return, the processor receives additional information related to the present floating interruption request on Data Bus 5 from ITC 3. This terminates the whole process of floating interruption handling with regard to the processors 1.

ITC 3, in the meantime, clears the factor of acknowledged floating interruption. This will permit another request to be handled immediately after ITC 3 issues the additional information on Data Bus 5 in response to the acknowledgement notification from the processor 1 on Control Bus 4.

Conventionally, a floating interruption request is issued and controlled in the manner illustrated in FIG. 8. Referring to the figure, each processor outputs an individual wait status to ITC 3 for informing ITC 3 of its wait status, using the WAIT-0/WAIT-1 signal. Each processor 1 also has an individual floating interruption request input, receiving FINT-1 and FINT-0 signals, from ITC 3. When a floating interruption condition occurs in ITC 3, ITC 3 monitors both WAIT-0 and WAIT-1 signals from all configured processors, and then determines which processor is likely to handle a floating interruption within the minimum time. As a result, ITC 3 outputs the FINT-0 and/or FINT-1 signal(s) for a floating interruption request to the processor(s) which it has chosen. If a processor 1 is in the wait status and outputs the WAIT-i (i=0 or 1) signal, it means that a processor does not execute any process but just waits for interruption.

The following is how ITC 3 determines which processor 1 should serve a floating interruption request, given the current wait status of all of the processors:

(1) ITC 3 sends a floating interruption request to all the processors in a wait state.

(2) If ITC 3 detects no processor in a wait state, ITC 3 sends the request to all the processors in the system.

Further activity in the system of FIG. 8, such as a floating interruption acknowledgement process and its starting announcement, are performed by a processor 1, in the same manner as those stated herein with reference to FIG. 7.

As stated above, the devices in the multiprocessor system use the buses frequently for the various purposes in the conventional interruption handling system. A high frequency of bus use results in a critical problem for a floating interruption handling system, involving a poor performance when transferring information. There could be a serious information bottleneck, thereby degrading overall system efficiency in time and performance. To be more specific, Control Bus 4 and Data Bus 5 are used for each of the following purposes:

(1) information transfer between two or more processors and the main memory 2;

(2) broadcasting a floating interruption request by ITC 3;

(3) broadcasting the announcement of starting a floating interruption acknowledgement process by a processor 1; and, (4) broadcasting the notification of a floating interruption acknowledgement for executing its acknowledgement process by a processor 1 for ITC 3.

Associated with such heavy bus use, there is yet another problem. When the buses are comparatively busy, reissuing a single floating interruption request using Control Bus 4 may not be desired when considering bus-use-efficiency. In order to avoid such a problem, a single use of a bus for a single purpose may be ideal for system efficiency. The application of this ideal method in the conventional system, however, leads to a waste factor. In other words, all the processors must receive a floating interruption request anyway, regardless of whether their internal conditions are ready for it or not, when a floating interruption request is issued on the bus. In this respect, extra hardware resources are needed in a processor 1 to receive a floating interruption request whenever ITC 3 issues such request. The extra hardware resources could be special additional circuits only for receiving the request whenever one is issued.

In the interruption handling system illustrated in FIG. 8, the individual installation of a wait status line and a floating interruption line between a processor 1 and ITC 3 for a single purpose, involves two aspects. One consideration is a positive feature, that is, a decreasing frequency of bus use. The other consideration is a negative feature, that is, increasing the number of signal lines and/or pins in the system. Better performance in handling a floating interruption is provided when the wait status lines are dedicated only for informing ITC 3 of the wait status of each processor 1. ITC 3, therefore, can easily decide which processor 1 to serve for a floating interruption, which is surely time-saving and contributes well to the achievement of a higher overall system efficiency. From an architectural point of view, however, the number of signal pins needed for those individual lines is another problem causing a fear of increasing the total number of lines and pins in the system. The matter is even worse when a processor 1 and ITC 3 are separately integrated in two or more LSIs or when the number of processors 1 is increased in a multiprocessor system.

SUMMARY OF THE INVENTION

In the view of the foregoing, it is an object of the present invention to provide an interruption handling system and method which improves the multiprocessor system performance by decreasing the frequency of bus use.

Another purpose of the present invention is to provide an interruption handling system and method which improves a floating interruption handling capacity in a processor by keeping the number of signal lines and pins minimized between a processor and ITC.

A further object of the present invention is to install an internal means of uniquely controlling the start of a floating interruption acknowledgement process in each processor.

A still further object is to provide a high-speed floating interruption handling system and method in a multiprocessor system.

These and other objects are accomplished by an interruption handling system which involves at least the following three kinds of communication lines. They are: (1) a common floating interruption line (a kind of interruption line) on which a floating interruption request is transferred from an interruption controller to all the processors; (2) a set of common control lines, which transfers control information among all the processors and the interruption controller and also transfers an acknowledgement notification of a floating interruption from a processor to the interruption controller; and, (3) a set of common data lines (a kind of data lines or common lines), which transfers additional information related to a floating interruption request from the interruption controller to a processor in response to an acknowledgement notification by a processor on a common control line.

The present invention further involves a plurality of processor means and an interruption controller, all of which are coupled in common to the interruption line, control lines, and data lines. Each of the processor means includes a means for acknowledging the interruption request on the interruption line, a means for notifying the interruption acknowledgement on the control lines, a means for processing the interruption handling routine based on data transferred on the data lines in case that the notifying means successfully notifies the interruption acknowledgement, and a means for checking the control lines and detecting the interruption acknowledgement notified by other processor means and canceling the operation of the acknowledging means and notifying means in case that another processor means first notifies the acknowledgement of the interruption request.

Each of the processor means includes, in case that the processor has an enabled condition for the interruption request, means for issuing the acknowledgement of the floating interruption in either case of a waiting condition wherein the processor is idle and waiting for a next interruption request, or a delayed condition wherein the processor spends a delay time after the processor detects the floating interruption request on the floating interruption line.

An interruption controller includes a means for issuing interruption request on the interruption line to said processor means, and means for transferring data related to the interruption request on data lines to the processor means after receiving the notification of the acknowledgement from the processor means.

The significance of the common interruption line disclosed in the present invention lies in its independent function from the other lines. The line is dedicated only to the transfer of an interruption request and can contribute toward decreasing the frequency of bus use. Installing a common floating interruption line instead of individual lines in the system for transferring an interruption request can actually allow the number of signal pins to decrease. The common floating interruption line provides a higher performance in the entire multiprocessor system.

Because information transferred on the common control lines can be commonly monitored by all the processors in the system, the processor which issues an acknowledgement notification on a control line can have more efficient procedures for informing of its status thereafter. The rest of the processors spontaneously cancel their internal operations for an interruption as soon as they recognize the notification on a control line.

The advantageous feature of the present invention is to provide a processor means of controlling an acknowledgement of an interruption in a processor. Accordingly, the system has a well-ordered performance of an interruption acknowledgement process by one of the plural processors. More specifically, a single processor can perform a floating interruption acknowledgement process prior to others, if it is in a wait state or has the shortest delay time specified as among all other processors. This contributes greatly to a high process-efficiency in the whole system of a multiprocessor.

Another aspect of the present invention lies in a multiprocessor system having plural processors comprising an external interruption controller for issuing a floating interruption request to the processors, receiving an acknowledgement of the floating interruption from one of the processors, transferring additional information related to the floating interruption request to the processor, and terminating the floating interruption request corresponding to the acknowledgement of the floating interruption received, a floating interruption line coupled to the external interruption controller and the processors, for transferring the floating interruption request from the external interruption controller to the processors, control lines having plural lines coupled to the external interruption controller and the processors, for transferring control signals between the external interruption controller and the processors and an acknowledgement of the floating interruption from one of processors to the external interruption controller, common line(s) having more than one line coupled to the external interruption controller and the processors, for transferring additional information related to the floating interruption request in response to the acknowledgement of the floating interruption on said control lines, and, processor means included in each of the processors, for monitoring the floating interruption line and control lines, and for acknowledging the floating interruption request.

Another aspect of the present invention lies in an interruption handling method having a plural of processors and an interruption controller coupled by an interruption line, control lines and common lines, comprising the steps of issuing an interruption request on the interruption line from the interruption controller, recognizing the interruption request on the interruption line, acknowledging the interruption request by the processors, notifying the acknowledgement on control lines by one of the processors, transferring information related with the interruption request on the common lines from the interruption controller, and, clearing the acknowledgement by detecting the notification on control lines from one of the processors.

DESCRIPTION OF THE PREFERRED EMBODIMENTS

Figure 1:
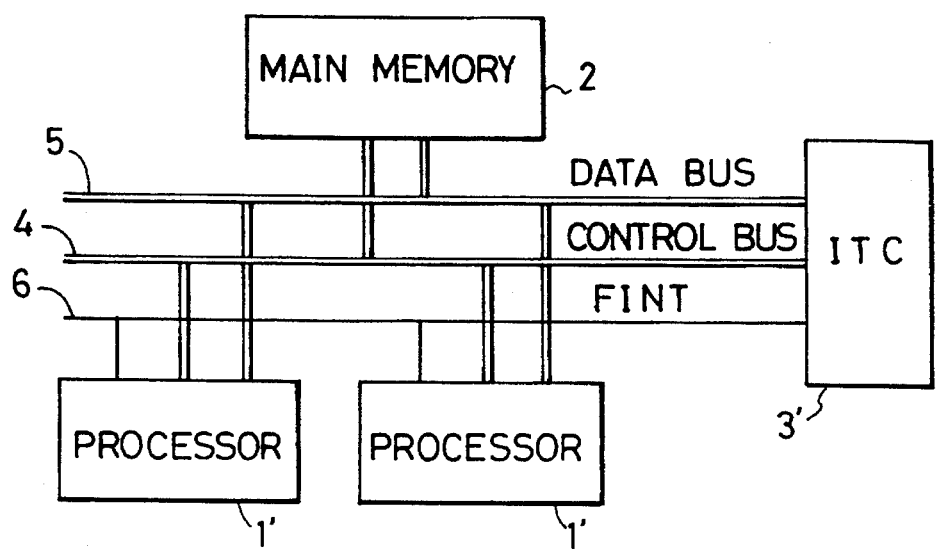
FIG. 1 is a block diagram showing a multiprocessor system configuration according to one embodiment of the present invention.
Figure 7:
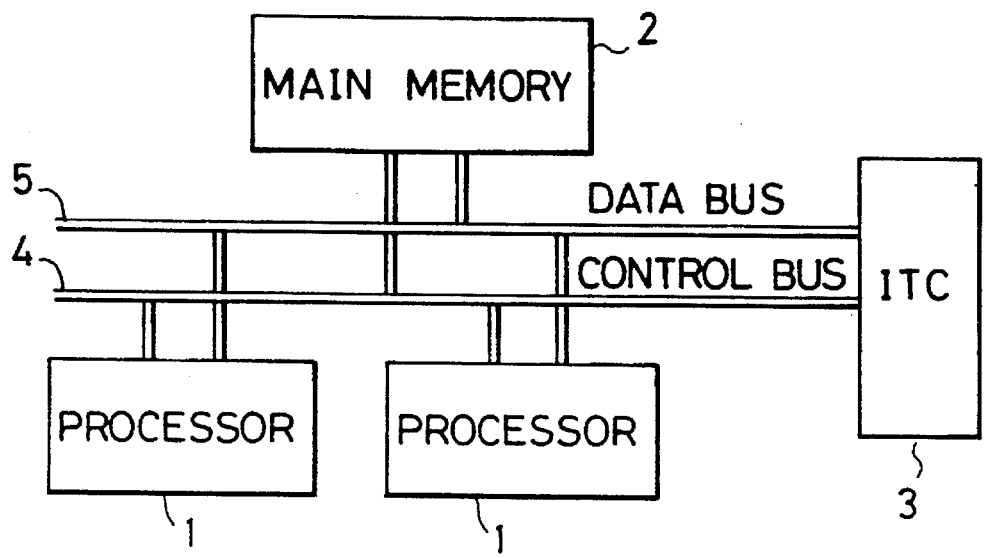
FIG. 7 is a block diagram showing a conventional multiprocessor system configuration.
Figure 8:
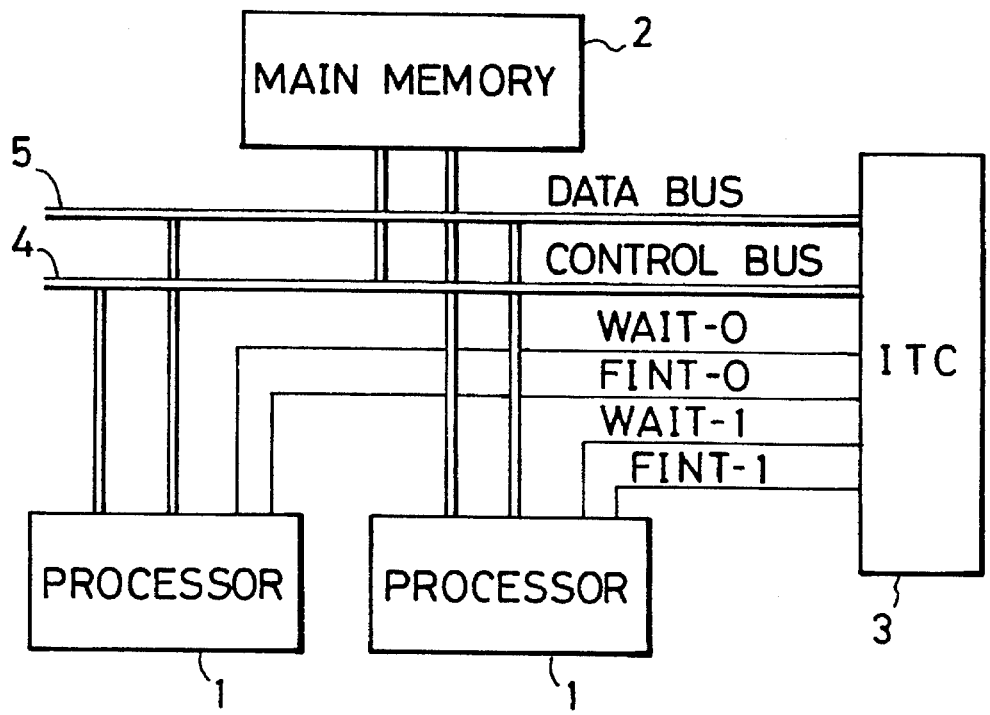
FIG. 8 is a block diagram showing another conventional multiprocessor system configuration.

FIG. 1 shows a multiprocessor system configuration illustrating a first embodiment of the present invention. The numerals 2, 4 and 5 in the figure are equivalent to those in the related art discussed earlier in FIG. 7 and FIG. 8. A common floating interruption line 6 (which will be called as a "FINT line" hereinafter) is an interface between ITC 3' and each processor 1' in a multiprocessor system. FINT line 6 transfers a floating interruption request as a FINT signal issued from ITC 3'.

Figure 2:
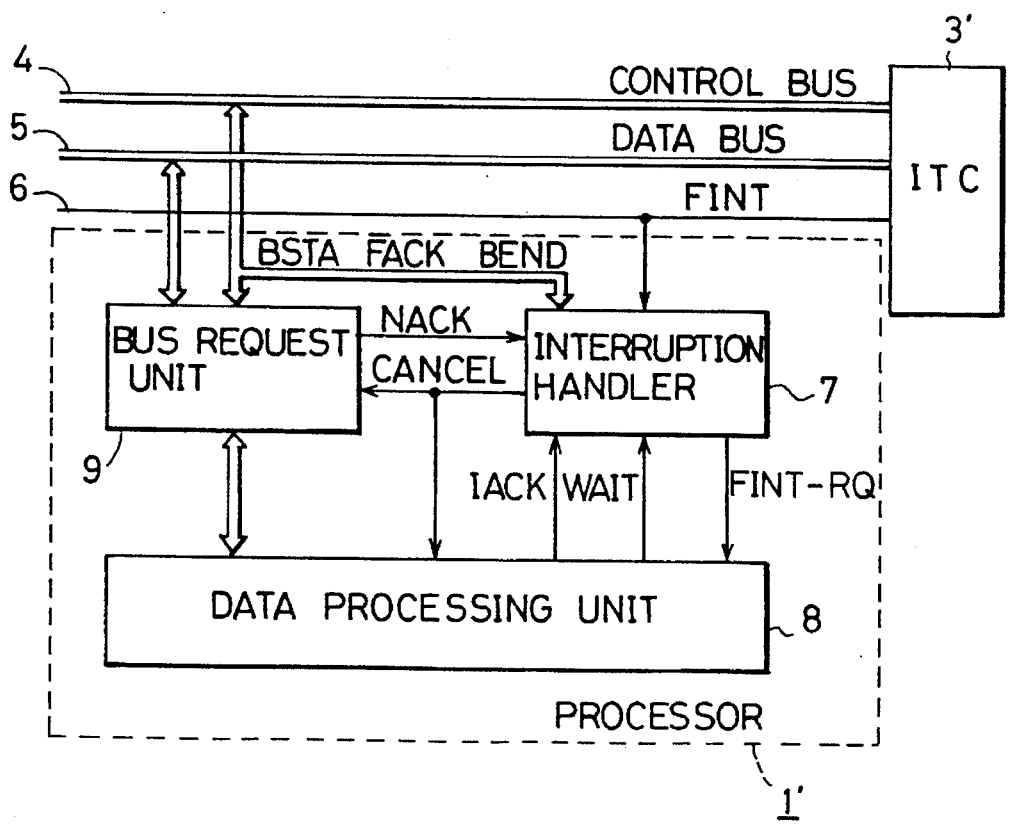
FIG. 2 is a block diagram of a processor configuration of a multiprocessor system shown in FIG. 1.

FIG. 2 is a block diagram showing the internal configuration of a processor 1', illustrating details of the first embodiment of the present invention. Referring to the figure, an interruption handler 7 controls a floating interruption request transferred on FINT line 6 into a processor 1'. A data processing unit 8 executes instructions and actually processes an interruption routine. A bus request unit 9 communicates with Control Bus 4 and/or Data Bus 5 in accordance with instructions from the data processing unit 8.

Figure 3:
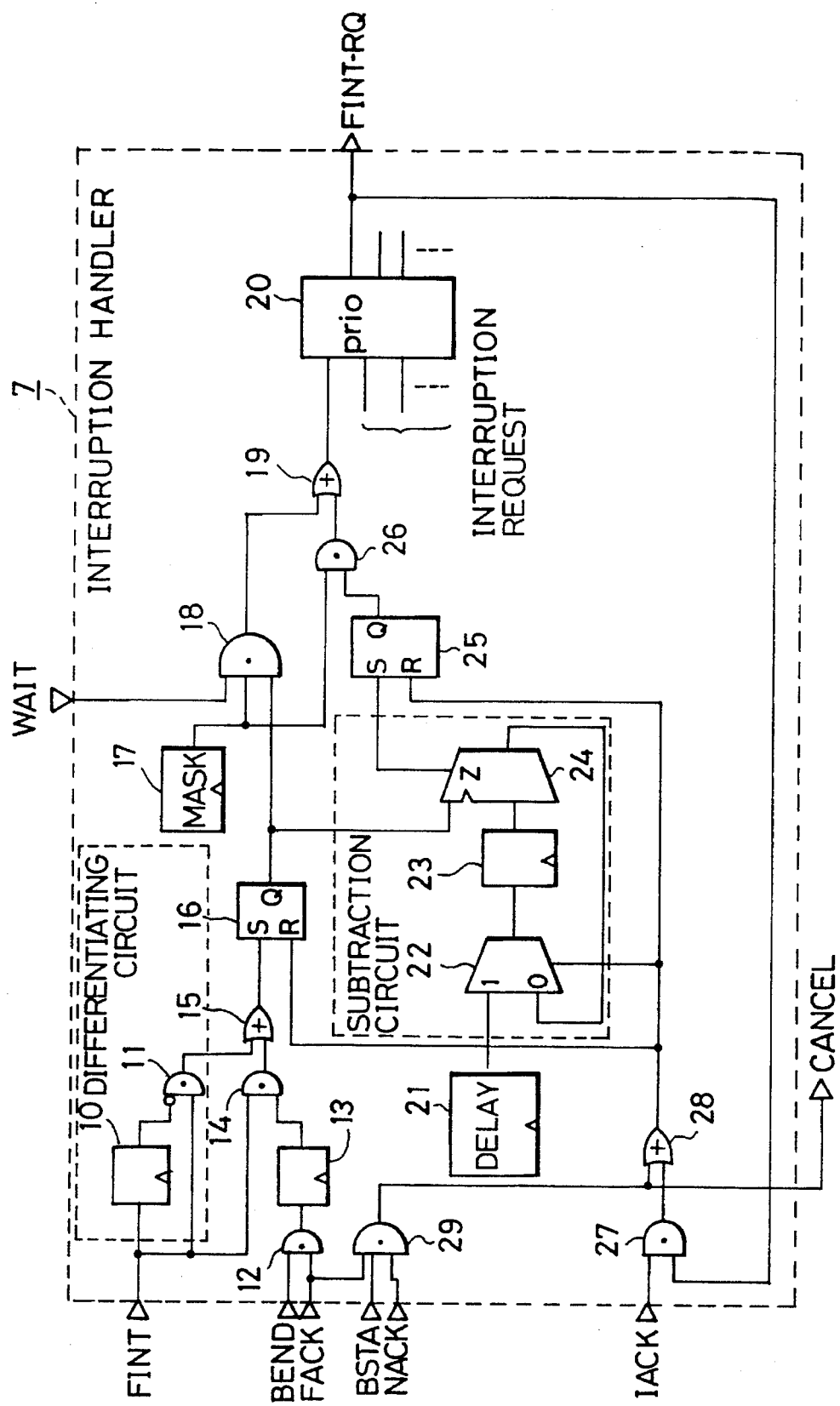
FIG. 3 is a logic diagram of internal section of an interruption handier of a processor shown in FIG. 1

FIG. 3 is a logical circuit diagram illustrating a floating interruption handling circuit in the interruption handler 7. Referring to the figure, the numerals 10, 13 and 23 indicate latches. The numerals 11, 12, 14, 18, 26, 27 and 29 indicate AND gates. The numerals 15, 19 and 28 indicates OR gates. A flip-flop 16 holds a floating interruption request signal indicating that the processor 1' has received it. A mask latch 17 holds mask information for controlling an interruption. A priority circuit 20 receives interruptions from various sources and gives priority orders in a processor and issues a prioritized request for starting an acknowledgement and notification process to the data processing unit 8. A delay cycle register 21 holds a certain number of cycles for delaying the start of an acknowledgement and notification process. The numeral 22 indicates a selector. A decrementer 24 subtracts the value, 1, responsive to the flip-flop 16, from a value set in the latch 23, and outputs the result of the subtraction. When the result reaches zero, the decrementer 24 issues a zero flag. A flip-flop 25 receives and holds a floating interruption request, after the lapse of a period of time that is created by a given unique delay time in the delay cycle register 21, and is passed after the initial arrival of the request in the flip-flop 16.

A floating interruption handling method is now presented in accordance with the first embodiment of the present invention. The following detailed description is divided into three main parts. The first part called "recognition process" deals with operations mainly in the interruption handler 7 in a processor 1'. Such operations concern the recognition process of a floating interruption request before the request reaches to the data processing unit 8. The second part called "acknowledgement process" deals with operations mainly in the data processing unit 8 in a processor 1'. Such operations concern the acknowledgement process of a floating interruption. The last part called "notification process" deals with operations in a processor 1' and between a processor 1' unit and ITC 3'. Such operations concern the notification process of the acknowledgement of a floating interruption, performed in and out of a processor 1', including ITC 3', Control Bus 4 and Data Bus 5.

The recognition process will be explained hereinafter. With reference to FIG. 3, it is to be assumed that the delay cycle register 21 in the interruption handler 7 in each processor 1'is set in advance with a corresponding unique non-zero value, which is also transferred to the latch 23 via the selector 22.

Initially in the floating interruption handling system, ITC 3' issues a floating interruption request on FINT line 6 when ITC 3' detects the occurrence of a floating interruption from a source or device. Carried into the interruption handler 7 in a processor 1', a FINT signal on FINT line 6 or a floating interruption request passes through a differentiating circuit at the time period of differentiated pulse marked by the latch 10 and the AND gate 11. The FINT signal thereafter sets in the flip-flop 16 via the OR gate 15. A floating interruption request held by the flip-flop 16 passes through the AND gate 18 only when the following two conditions of a processor 1' are satisfied: one is that the acknowledgement mask latch 17 be in the enabled state for the acknowledgement of a floating interruption, and the other is that the WAIT signal be output from the data processing unit 8. These two conditions indicate that the processor 1' is ready for an interruption. Consequently a floating interruption request reaches the priority circuit 20 through the OR gate 19.

Further, the output signal of flip-flop 16 takes another course to the decrementer 24. The decrementer 24 is involved in a subtraction circuit. A floating interruption request from the flip-flop 16 is input to the decrementer 24 as the value of "1". The flip-flop 16 keeps outputting the value as long as it holds a floating interruption request on. The decrementer 24 subtracts the value of "1" from the stored value in the latch 23, which originates from a unique pre-set value in the delay cycle register 21. The subtracted result is fed back to the selector 22 of the subtraction circuit. The result is transferred to the latch 23 via the selector 22 in the subtraction circuit with another cycle for another subtraction. This subtraction process is repeated so long as a floating interruption request remains set in the flip-flop 16. The subtraction circuit subtracts one for each cycle. Such subtraction process is carried out until a subtracted result reaches zero, where the decrementer 24 issues a zero flag to set a floating interruption request on the flip-flop 25. A floating interruption request through the flip-flop 25 passes through the AND gate 26 only when the following condition is satisfied: the flip-flop 25 is set, and the acknowledgement mask latch 17 is in the enabled state for the acknowledgement of a floating interruption. Through the AND gate 26, a floating interruption request reaches the priority circuit 20 in the interruption handler 7 via the OR gate 19.

In the priority circuit 20, implementing the priority scheme, a fixed priority order has been assigned in advance to each interruption including a floating interruption. When a priority is given to a floating interruption request among other interruptions, the priority circuit 20 outputs the FINT_RQ signal or an acknowledgement request to the data processing unit 8.

There is another condition to set the floating interruption request on flip-flop 16 in addition to the above-mentioned condition detected by the differentiating circuit.

A floating interruption acknowledgement process involves a bus operation using Control Bus 4 and Data Bus 5 between one of processors 1 and ITC 3.

There is a case that ITC 3 detects another floating interruption for the next to be handled prior to the end of the bus operation for the floating interruption acknowledgement process.

In this case, ITC 3 does not negate the FINT line 6 and keeps the FINT line 6 "on" even after the end of the bus operation. However, each of the processors does not know consecutive floating interruption request because the differentiating circuit does not detect a differentiating pulse from such FINT line 6. It is essential for all the processors to be able to recognize consecutive floating interruption request if the FINT line 6 is kept to be "on" by ITC 3 at the end of the bus operation.

A BEND signal and a FACK signal are checked to identify the end of the bus operation for the floating interruption acknowledgement process. One of processors issues FACK signal on Control Bus 4 for notifying the floating interruption acknowledgement to ITC 3. Then, ITC 3 issues a BEND signal on Control Bus 4 at the end of the bus operation. The BEND signal indicates a termination of information transfer on Data Bus 5 for the bus operation. Recognizing the BEND signal on Control Bus 4, the processor that issued the FACK signal negates the FACK signal.

Therefore, the end of the bus operation for the floating interruption acknowledgement process can be detected by checking both of the FACK signal and the BEND signal. The AND gate 12 inputs the FACK signal and the BEND signal, and set the flip-flop 13 if both FACK and BEND signals are "on". The flip-flop 13 indicates the end of the bus operation. If the FINT signal is "on" at this time, the AND gate 14 opens and the flip-flop 16 sets the another floating interruption request issued by ITC 3.

Figure 4:
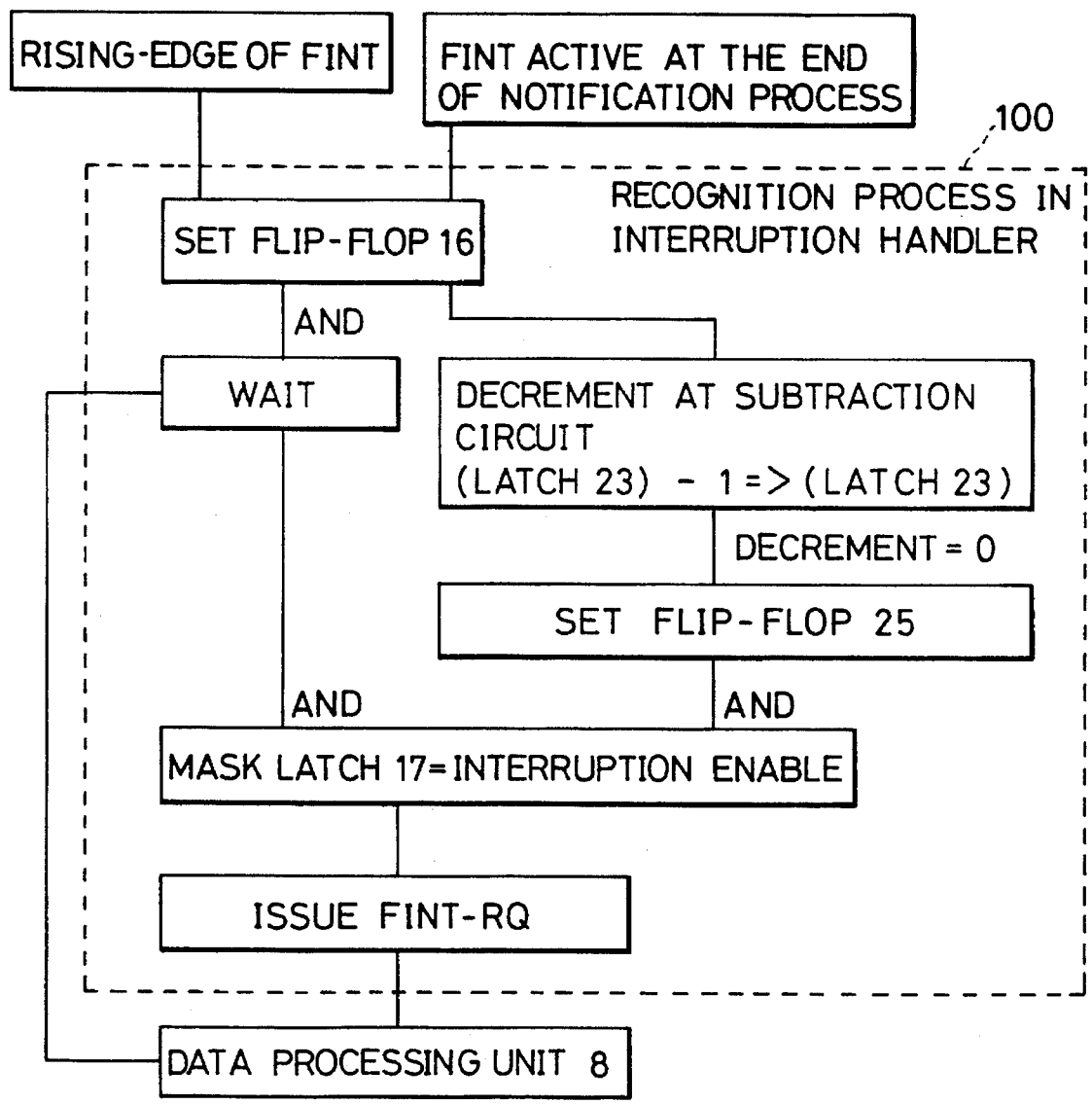
FIG. 4 is a flow chart for explaining the recognition process of the interruption handler shown in FIGS. 2 and 3.

Summing up the recognition process in the interruption handler 7 with reference to FIG. 4, conditions are focused for opening logic gates involved in the circuit in FIG. 3 in order to accomplish the task of issuing the FINT_RQ signal to the data processing unit 8. When output from the flip-flop 16, a floating interruption request may open AND gate 18 or 26. The AND gate 18 input involves three input lines from the flip-flop 16, the acknowledgement mask latch 17 and the data processing unit 8 of the WAIT signal. The AND gate 26 input involves two input lines from the acknowledgement mask latch 17 and the flip-flop 25. The nature of the AND gate requires a specific condition that all the elements influencing AND gates output set-signals to open the gate. In this respect, the mask latch 17 should be in the enabled state for the acknowledgement of a floating interruption in any case in order to open the AND gate 18 or 26. If the acknowledgement mask latch 17 is in the disabled state, the AND gate 18 or 26 will naturally stay closed and consequently a floating interruption request can never reach the priority circuit 20. Another influential element on the AND gate 18 is the WAIT signal, which is carried from the data processing unit 8. The WAIT signal indicates that the processor has a wait status and is ready for an interruption. Concerning the wait status of a processor 1', the following three conditions are considered with regard to the AND gates 18 and 26: (1) The AND gate 18 can open to let a floating interruption request pass through if the processor, outputting the WAIT signal, is in the wait status, i.e., is ready for an interruption; (2) The AND gate 18 can open immediately after receiving the WAIT signal upon termination of a program executing in a processor for the moment; and (3) The AND gate 18 will not open but the AND gate 26 will open after the interruption request spends a given unique delay time in the subtraction circuit if the processor is busy, not outputting the WAIT signal, and given a unique value set in the floating interruption delay cycle register 21. The AND gate 26 will always open when there is a zero flag output from the decrementer 24 and the acknowledgement mask latch 17 is in the enabled state as well. The condition of the mask latch, enabled or disabled, dominates the floating interruption handling process of a floating interruption request reaching the priority circuit 20 and of the issuance of the FINT-RQ signal or a request for a floating interruption acknowledgement reaching the data processing unit 8.

Figure 5:
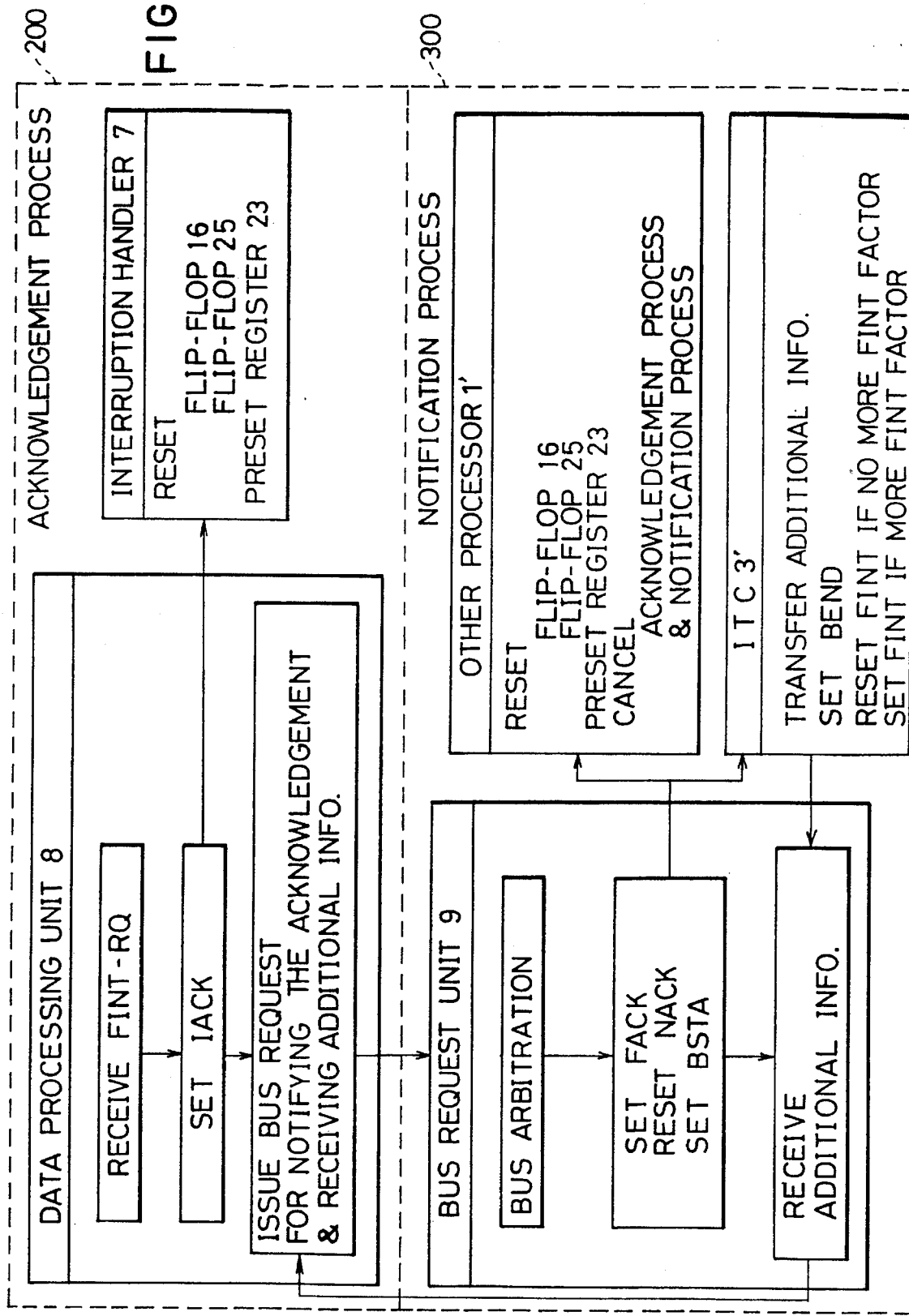
FIG. 5 is a flow chart for explaining the acknowledgement process and notification process of the system shown in FIGS. 1, 2 and 3.
Figure 6:
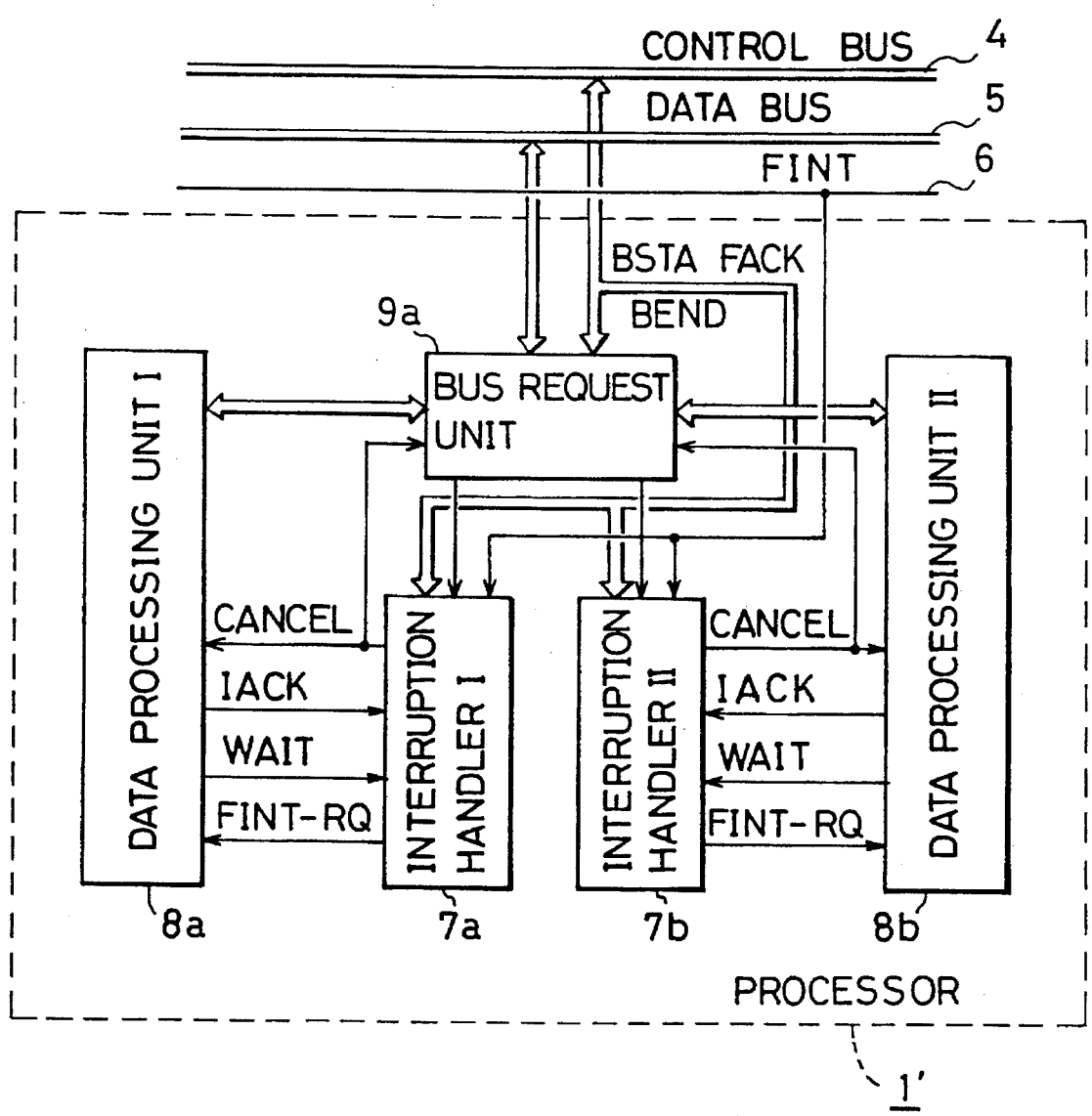
FIG. 6 is a block diagram of a processor configuration of a multiprocessor system according to another embodiment of the present invention.

The detailed description of an acknowledgement process performed in a processor 1' is now presented with reference to FIG. 3 and FIG. 5. Assume that the FINT_RQ signal is issued from the interruption handler 7. The data processing unit 8 receives the start request with its convenient cycle in accordance with its internal condition. In reply to the FINT_RQ signal the data processing unit 8 transfers back the IACK signal, informing the interruption handler 7 that it has acknowledged the floating interruption request. If the interruption handler 7 does not receive the IACK signal soon after it issued the FINT_RQ signal due to the internal condition of the data processing unit 8, the interruption handler 7 keeps outputting the FINT_RQ signal until it receives the IACK signal by retaining a floating interruption request on the flip-flop 16 or 25. On reception of the IACK signal from the data processing unit 8, the interruption handler 7 goes into the following clearing or resetting operation of the recognition process. Specifically, the IACK signal opens the AND gate 27 and reaches the flip-flop 16 or 25 to reset the floating interruption request via the OR gate 28. The IACK signal also reaches the selector 22 via the AND gate 27 and the OR gate 28. The selector 22 transfers the pre-set value on the delay cycle register 21 to the latch 23 again for processing another floating interruption request transferred on FINT line 6 from ITC 3'.

The detailed description of the rest of the acknowledgement process performed in a processor 1' and the notification process involving a processor 1' and ITC 3' using Control Bus 4 and Data Bus 5 are now presented with reference to FIG. 5.

On reception of a floating interruption acknowledgement request, the data processing unit 8 starts handling the floating interruption. The data processing unit 8 issues a bus request to the bus request unit 9 for the notification of the acknowledgement of a floating interruption toward ITC 3' and for receiving additional information related to the floating interruption. After receiving the bus request, the bus request unit 9 tries to gain the priority of exclusive access to Control Bus 4 and Data Bus 5 through use of a bus arbitration technique. The conventional bus arbitration system or technique will not be discussed here since it is well known and is not essential to the present invention.

With the acquisition of the buses through the bus arbitration procedure, the bus request unit 9 sets the FACK signal on Control Bus 4, notifying that the processor 1' has acknowledged the floating interruption. It also negates the NACK signal, informing the interruption handler 7 that the processor 1' is going to use the buses. It then sets the BSTA signal to "ON", indicating the start of information transfer on the buses. Signals, such as BSTA and FACK, that are carried on the buses are monitored simultaneously by all the devices in the multiprocessor system including all the processors, a main memory 2 and ITC 3'. Those devices evaluate information on the buses and decide whether to answer it or not by themselves. In this case, with the FACK signal on the bus, it is not other processors, but only ITC 3' that will answer.

The other processors, having no priority to access buses, do not actually participate in the further performance of handling the interruption. However, they carry out a cancellation task of the floating interruption request internally. Under such circumstances the FACK and BSTA signals are set "ON" and the NACK signal remains "ON" in the interruption handler 7 in each processor 1', and the AND gate 29 will open. So does the OR gate 28. Consequently a floating interruption request set in the flip-flop 16 or 25 is cleared. The unique value set in advance on the delay cycle register 21 is reset on the latch 23 via the selector 22. This cancellation method contributes significantly to the prevention of a conflict where two or more processors start an acknowledgement process for a single floating interruption request. Under such a situation, however, the following potential event occurs. A processor 1' may start transferring the notification of a floating interruption acknowledgement on Control Bus 4 just after another processor has already acknowledged the FINT_RQ signal in its data processing unit 8. To solve this problem the CANCEL signal is output to the data processing unit 8 and the bus request unit 9 to cancel its acknowledgement process. With the CANCEL signal, the data processing unit 8 cancels its bus request for the acknowledgement and notification process. The data processing unit 8 also cancels the acknowledgement process and returns to the execution of the program which was suspended by the interruption.

ITC 3', meanwhile, is assigned the following tasks in recognition of the BSTA and FACK signals on Control Bus 4: (1) ITC 3' issues additional information related to a floating interruption request on Data Bus 5. (2) ITC 3' negates the FINT signal on FINT line 6 if it has no other interruption sources to handle; if ITC 3' has another floating interruption for the next to be handled, it keeps the FINT signal "ON". (3) ITC 3' issues a BEND signal on Control Bus 4 upon termination of information transfer on Data Bus 5. Recognizing the BEND signal on Control Bus 4, the processor 1' that issued the acknowledgement notification will receive additional information related to the floating interruption request on Data Bus 5 for the end of the series of the bus transfer operation. Additional information is transferred into the data processing unit 8 through the bus request unit 9. This terminates the acknowledgement and notification process, leading to the end of the entire floating interruption acknowledgement process.

As described above, the embodiment given here explains a floating interruption handling method in a multiprocessor system with two or more processors. One of the distinctive features of this embodiment lies in the system configuration with the following four units: (1) an external interruption controller or ITC, (2) a common floating interruption line or FINT line, (3) common control lines or Control Bus and, (4) common data lines or Data Bus. The tasks or functions of those devices or units in detail are as follows:

(1) ITC is assigned to the following three tasks.

(a) ITC issues a floating interruption request. The request is simultaneously recognized by all the processors in the system. Only one of them can acknowledge the request prior to others and executes a floating interruption acknowledgement process.

(b) ITC issues additional information related to a floating interruption request in response to an acknowledgement notification of a floating interruption from a processor 1'.

(c) ITC performs a termination process of a floating interruption handling resetting the request.

(2) FINT line, connecting ITC with all the processor 1 units in the system, transfers a floating interruption request from ITC to the processor 1' units.

(3) Control Bus is a set of signal lines, connecting ITC with all the processors in the system. It controls bidirectional signal transfers between ITC and the processors and transfers an acknowledgement notification of a floating interruption from a processor 1' to ITC as well.

(4) Data Bus, comprising one or more signal lines, connects ITC with all the processor units in the system. It transfers additional information related to a floating interruption request from ITC in response to a notification of a floating interruption acknowledgement by a processor 1' on Control Bus.

Another distinctive feature of this embodiment is that each processor 1' in the system, constantly monitoring FINT line and Control Bus, recognizes a floating interruption request on the FINT line when the request is issued from ITC. Processors can also recognize the request through the monitoring method while the request is kept asserted on FINT line even after a notification process is completed between ITC and a processor using the bus.

Another distinctive feature of this embodiment lies in a processor means to control the acknowledgement of a floating interruption request provided in each processor 1'. A processor 1' starts the acknowledgement and notification process of a floating interruption after it recognizes a floating interruption request with its acknowledgement as well as wait status for a floating interruption with no instruction executing. If, on the other hand, a processor 1' is not a wait status, the processor delays its start of the acknowledgement and notification process. The processor starts the process for its acknowledgement state after a delay time.

Another distinctive feature of this embodiment lies in providing a changeable setting for the delay-time in each processor 1'. By selecting delaying the start of an acknowledgement and notification process when each processor recognizes a floating interruption request, conflict may be avoided.

Another distinctive feature of this embodiment lies in the method of clearing the recognition and/or cancelling its process of a floating interruption request in a processor 1'. A processor 1' executes a clearing process when it verifies the start of the acknowledgement and notification process in itself. A processor 1' executes a cancelling process when it verifies a notification of a floating interruption acknowledgement on the Control Bus from another processor 1' to the ITC.

As previously mentioned, one of the advantages of the present invention shown in this embodiment is that it provides an independent common floating interruption (FINT) line. FINT line is devoted only to the broadcast of floating interruption requests toward all the processors in the system from ITC 3'. The buses are, therefore, left free from a requirement to transfer floating interruption requests. This contributes to a reduction in the frequency of information transfers on the buses and to an increase in the system efficiency as well. Besides, the FINT line minimizes the number of signal lines and pins between ITC 3' and each processor 1' and consequently prevents a multiprocessor system from increasing the number of signal pins and lines if devices or units in the system are configurated in LSI chips.

Another advantage is that the present invention provides common control lines or a Control Bus which are constantly monitored by all the processors in the system. The Control Bus transfers an acknowledgement and notification from a processor 1' to ITC 3'. Under the above occasion, the processors (except one in the notification process) automatically clear the recognition of a floating interruption request internally when they detect the notification on the Control Bus. Such processors also cancel their internal processes of the acknowledgement and notification when they notice a notification on the bus. In other words, a notification on Control Bus to the ITC from a processor 1' managed to execute an acknowledgement process of a floating interruption prior to others can actually cancel automatically the other processors' internal conditions for acknowledgement. Thus a processor 1' can gain an exclusive status preventing others from performing an interruption handling. That is, the processor does not need to execute a special cancellation process. The previously mentioned automatic cancellation contributes to the reduction of the time required for determining which processor in the system should perform an acknowledgement process for a floating interruption.

Another advantage of the present invention is to provide a processor unit to control an acknowledgement process of a floating interruption. A floating interruption request recognized in a processor 1' is handled in this processor unit. This processor unit controls the acknowledgement process in accordance with the status of the processor, busy or waiting for an interruption. A busy processor is to suspend its acknowledgment process during a given unique delay time. The processor with the wait status or with the shortest delay time takes the priority to perform a floating interruption acknowledgement process prior to others. This contributes to the effective coordination of load-sharing among processors in the system and to the accomplishment of a highly effective performance in the entire multiprocessor system as well.

In the first embodiment, the delay cycle register 21 in the interruption handler 7 in each processor 1' is set in advance with a unique value. Alternatively, the delay cycle register 21 may be set with a common non-zero value, which can be shared with two or more processors in the system. In this case, two or more processors try to start an interruption acknowledgement process simultaneously. Such a conflict can be avoided by the conventional bus arbitration technique.

In the first embodiment Control Bus 4 and Data Bus 5 transfer information bidirectionally among processors, ITC 3' and the main memory 2. Alternatively, a memory bus, which connects the main memory 2 with processors, can be provided separately from others in the system. The same performance as that in the first embodiment can be expected with this system configuration.

In the first embodiment the multiprocessor system comprises two processor units and others as shown in FIG. 1.

The present invention can be applied to any multiprocessor system configuration with three or more processors. The performance in that situation can be expected the same as that in the first embodiment.

Also, in the first embodiment, a processor 1' is connected with Control Bus 4 and Data Bus 5 and comprises a single interruption handler 7, a data processing unit 8 and other units as shown in FIG. 2. Alternatively, the processor 1' may comprise two or more interruption handlers and data processing units as the one shown in FIG. 4 (7a and 7b; 8a and 8b) for instance. The performance in that situation can be expected the same as that in the first embodiment.

Finally, the present invention can be provided with another system configuration on a single or more LSI chip(s).

What is claimed is:

1. An interruption handling system, having an interruption controller and a plurality of processors, for processing a interruption handling routine, comprising:
   (a) a common interruption line for transferring an interruption request from said interruption controller to each of said plurality of processors;
   (b) a first bus including a plurality of control lines for transferring control information between said interruption controller and said plurality of processors;
   (c) a second bus including a plurality of data lines for transferring data between said interruption controller and said plurality of processors; and
   (d) an interrupt acknowledgment line for transferring an interrupt acknowledgment from a first one of the plurality of processors that responds to the interruption request to the others of the plurality of processors;
   wherein said plurality of processors each includes:
   (1) means for internally acknowledging a receipt of said interruption request;
   (2) means for notifying said interruption controller of the receipt of said interruption request on the interrupt acknowledgment line;
   (3) means for processing an interruption handling routine based on data transferred from said interruption controller on said data lines in response to said notifying means notifying the interruption controller of the receipt of said interruption request;
   (4) means for checking said interrupt acknowledgment line and detecting an interruption acknowledgment notified by another processor, and for canceling an operation of said acknowledging means and of said notifying means in response to the other processor first notifying a receipt of said interruption request;
   wherein the interruption controller includes:
   (1) means for issuing an interruption request on said common interruption line to said plurality of processors; and,
   (2) means for transferring data related to the interruption request on said data lines to one of said processors after receiving the notification of the acknowledgment from one of said processors.

2. The interruption handling system of claim 1, wherein each said processor further includes recognizing means for recognizing said interruption request, including:
   means for storing a predetermined delay time corresponding to said processor;
   means for receiving said interruption request transferred on said common interruption line;
   counting means, responsive to a receipt of the interrupt request by the means for receiving, providing a delay signal after the predetermined delay time has expired;
   means for checking a wait status of said processor to determine whether the processor is busy; and,
   means for providing a recognition signal to said acknowledging means, said recognition signal being generated based on at least one of the wait status and the delay signal.

3. The interruption handling system of claim 2, wherein said recognizing means further includes means for masking said recognition signal so that said recognizing means suspends the issuance of an acknowledgment request.

4. The interruption handling system of claim 2, wherein said receiving means includes two holding circuits, a first holding circuit for holding said interruption request when said request is detected on said common interruption line, and a second holding circuit for holding said interruption request after said counting means counts said predetermined delay time.

5. The interruption handling system of claim 4, wherein said counting means includes a subtraction circuit coupled to the first and second holding circuits add to the means for storing the predetermined delay time, which decrements said delay time until zero and sets said interruption request into said second holding circuit.

6. A multi processor system having a plurality of processors, comprising:
   (a) an external interruption controller including:
      means for issuing a common floating interruption request to each of the plurality of processors,
      means for receiving an acknowledgment of said floating interruption from one of the processors,
      means for transferring additional information related to said common floating interruption request to said one processor, and
      means for terminating said common floating interruption request in response to receipt of an acknowledgment of said common floating interruption request;
   (b) a common floating interruption line coupled to said external interruption controller and to each of the processors, for transferring said common floating interruption request from said external interruption controller to each of the processors;
   (c) a common interrupt acknowledgment line, coupled to each of the processors, for transferring an acknowledgment from a first one of the processors that responds to the floating interrupt request, to the interruption controller and to the others of the processors;
   (d) data lines means coupled to said external interruption controller and the processors, for transferring additional information related to said common floating interruption request in response to said acknowledgment of said floating interruption on said control lines; and
   (e) processor means in each of the processors, including:
      means for monitoring said common floating interruption line and control lines,
      means for acknowledging said common floating interruption request on the common interrupt acknowledgment line, and
      means, responsive to an acknowledgment on the common interrupt acknowledgment line provided by the first one of the processors to respond to the floating interruption .request, for canceling an acknowledgment of said common floating interrupt request.

7. The multi processor system of claim 6, wherein said means for acknowledging of said processor means comprises;

means for holding said common floating interruption request; and means, responsive to the processor having an enabled condition for said interruption request, for issuing said acknowledgment of said floating interruption in one of a case in which the processor is idle and waiting for a next interruption request, and a case in which the processor waits a delay time after the processor detects said common floating interruption request on said common floating interruption line.

8. The multi processor system of claim 7, wherein said delay time is predefined for each processor prior to the detection of said common floating interruption request on said common floating interruption line and is selectable correspondingly for each of the processors.

9. The multi processor system of claim 7, wherein said processor means further comprises;

means for clearing said acknowledged common floating interruption request held by said holding means in one of a first case when said acknowledgment of said common floating interruption request is issued by said processor on said control lines, and a second case when said acknowledgment of said common floating interruption request is detected on said control lines issued by another one of the processors.

10. The multi processor system of claim 6, wherein said processor means comprises:

(a) an interruption handler for recognizing said common floating interruption line;

(b) a bus request unit for interfacing with said control lines and data lines; and, (c) a data processing unit for acknowledging said common floating interruption request and notifying said acknowledgment of said common floating interruption request to said external interruption controller and receiving the additional information from said external interruption controller through said bus request unit.

11. The multiprocessor system of claim 10, wherein the processor means comprises a plurality of sets of said interruption handier and said data processing unit.

12. An interruption handling method in a system having a plurality of processors and an interruption controller coupled in common by a common interruption line, a common acknowledgment line, control lines and data lines, the method comprising the steps of:

(a) issuing an interruption request on the common interruption line from the interruption controller to each of the plurality of processors;

(b) recognizing said interruption request on the common interruption line by the plurality of processors;

(c) acknowledging said interruption request internally by at least one of the plurality of processors;

(d) notifying the interruption controller and the others of the plurality of processors of said acknowledgment by providing an external interrupt acknowledgment on the acknowledgment line by a first one of the plurality of processors to respond to the interruption request;

(e) transferring information related to said interruption request on said data lines from the interruption controller to said first one of the processors; and (f) clearing the internal acknowledgment of said interruption request, by each of the others of the plurality of processors, by detecting the external interrupt acknowledgment from the first one of the plurality of processors.

13. The interruption handling method of claim 12, wherein the recognizing step comprises the steps of:

(1) holding said interruption request transferred on the common interruption line;

(2) requesting acknowledgment of the interruption request when either the processor is in wait status or the processor spends a predefined time set for each processor processors, if a mask condition of the interruption acknowledgment is in an enabled state; and (3) continuing to hold the interruption request until said clearing step clears.

14. The interruption handling method of claim 12, wherein the acknowledging step comprises the steps of:

(1) receiving the request to acknowledge;

(2) informing the acknowledgement internally by setting an internal signal; and, (3) issuing a bus request for notification of the interruption acknowledgement.

15. The interruption handling method of claim 12, wherein the notifying step comprises the steps of:

(1) arbitrating to use the control lines and data lines; and (2) issuing the notification of the interruption acknowledgment to the interruption controller and other processors by sending a predefined signal on the control lines.

16. The interruption handling method of claim 12, wherein the transferring step comprises the steps of:

(1) detecting the notification of the acknowledgement so that the interruption controller knows that the interruption request is acknowledged;

(2) transferring the additional information;

(3) terminating the interruption request by sending a terminating signal on control lines.

17. The interruption handling method of claim 12, wherein the clearing stop comprises the steps of:

(1) detecting the acknowledgment by the internal signal and clearing the interruption request held by said holding step; and, (2) detecting the notification of the acknowledgment on the common acknowledgment line so that the processor knows that the interruption request is acknowledged by one of other processors, and clearing the interruption request held by said holding step and canceling said acknowledging step and notifying step.

18. An interruption acknowledgment method in a system having a plurality of processors and an interruption controller coupled in common by a common interruption line, control lines and data lines, comprising the steps of:

(a) issuing an interruption request on the common interruption line from the interruption controller;

(b) recognizing said interruption request on the common interruption line by the plurality of processors;

(c) acknowledging said interruption request by at least one of the processors;

in response to:

(a) the processor being in a wait status and waiting for the interruption; and (b) the processor acknowledging the interruption after waiting a delay time which is predefined to a different value for the each of the plurality of processors.

19. An interruption handling system, comprising:

a plurality of processors for executing a plurality of interruption routines;

an interruption controller, coupled to each of the plurality of processors via a common control bus and a common data bus;

a common floating interruption line, coupled to each of the plurality of processors and to the interruption controller, for transferring a floating interruption request from the interruption controller to each of the plurality of processors; and an interrupt acknowledgment line, coupled to each of the plurality of processors and to the interruption controller, for transferring an interrupt acknowledgment signal from a first one of the plurality of processors that responds to the floating interrupt request;

each of the plurality of processors including:

acknowledging means, coupled to the common floating interrupt line, for acknowledging a receipt of the floating interruption request;

notifying means, coupled to the acknowledging means and to the common data bus and common control bus, for notifying the interruption controller of the receipt of a floating interruption request by providing an interrupt acknowledgment signal on the interrupt acknowledgment line; and canceling means, coupled to the acknowledging means and the notifying means and operative in response to the interrupt acknowledgment signal provided by the first one of the plurality of processors, for canceling a notification of the receipt of the floating interruption request by the processor.

20. The system of claim 19, wherein the acknowledging means includes:

a latching circuit, coupled to the common floating interruption line, that provides a latched signal in response to a receipt of a floating interruption request over the common floating interrupt line; and a timing circuit, coupled to the latching circuit, that delays the latched signal by a predetermined delay period to provide a delayed latched signal to the notification means, the predetermined delay period for a processor being different from a predetermined delay period of each of the other of the plurality of processors.

21. The system of claim 20, wherein the acknowledging means further includes means, operative in response to the cancellation means, for resetting the latching circuit and the timing circuit to prevent a propagating of the delayed latched signal to the notification means.

22. The system of claim 20, wherein the acknowledging means of each of the plurality of processors further includes a gating circuit, coupled in series with the delayed latched signal, that interrupts a propagating of the delayed latched signal to the notification means in response to a masking signal being asserted by the processor.

23. The system of claim 20, wherein the acknowledging means of each of the plurality of processors further includes a gating circuit, coupled in series with the delayed latched signal, that interrupts a propagating of the delayed latched signal to the notification means in response to the processor being busy.

24. The system of claim 20, wherein the notifying means includes a bus request unit, coupled to the acknowledging means and to the common control bus and common data bus, to provide at least one control signal to the control bus to notify the interruption controller of an acknowledgment, and to receive over the common data bus from the interruption controller, additional information for executing an interruption routine.

25. An interruption handling system, comprising:

a plurality of processors for executing a plurality of interruption routines;

an interruption controller, coupled to each of the plurality of processors via a common control bus and a common data bus;

a common floating interruption line, coupled to each of the plurality of processors and to the interruption controller, that transfers a floating interruption request from the interruption controller to each of the plurality of processors; and an interrupt acknowledgment line, coupled, to each of the plurality of processors and to the interruption controller, for transferring an interrupt acknowledgment signal from a first one of the plurality of processors that responds to the floating interrupt request to the other of the plurality of processors and to the interruption controller;

each of the plurality of processors including:

an interruption handler, coupled to the common floating interruption line, that acknowledges a receipt of the floating interruption request, the interruption handler including canceling means, operative in response to the interrupt acknowledgment signal received from the first one of the plurality of processors that responds, for canceling an acknowledgment of the receipt of the floating interruption request by the processor;

a bus request unit, coupled to the interruption handler and to the common data bus and common control bus, that notifies the interruption controller of the receipt of a floating interruption request; and a data processing unit, coupled to the interruption handler and to the bus request unit, that executes the interruption routine.

26. The system of claim 25, wherein the bus request unit further includes means for arbitrating the common data bus and common control bus, and means for receiving additional information for the execution of the interruption routine.

27. The system of claim 25, wherein the interruption handler further includes:

a latching circuit, coupled to the common floating interruption line, that provides a latched signal in response to a receipt of a floating interruption request over the common floating interrupt line; and a timing circuit, coupled to the latching circuit, that delays the latched signal by a predetermined delay period to provide a delayed latched signal to the bus request unit, the predetermined delay period for a processor being different from a predetermined delay period of each of the other of the plurality of processors.

28. The system of claim 27, wherein the acknowledging means further includes cancellation means, operative in response to a notification of a receipt of a floating interruption request by another of the plurality of processors, for resetting the latching circuit and the timing circuit to prevent a propagating of the delayed latched signal to the bus request unit.

29. The system of claim 27, wherein the acknowledging means of each of the plurality of processors further includes a gating circuit, coupled in series with the delayed latched signal, that interrupts a propagating of the delayed latched signal to the bus request unit in response to a masking signal being asserted by the processor.

30. The system of claim 27, wherein the acknowledging means of each of the plurality of processors further includes a gating circuit, coupled in series with the delayed latched signal, that interrupts a propagating of the delayed latched signal to the bus request unit in response to the processor being busy.

31. The system of claim 25, wherein the bus request unit includes means for providing the interrupt acknowledgment signal to the interrupt acknowledgment line to notify the interruption controller of an acknowledgment, and to receive over the common data bus from the interruption controller, additional information for executing an interruption routine.

32. A method for processing an interruption, comprising the steps of:

A. broadcasting a floating interruption request from an interruption controller to each of a plurality of processors;

B. initiating, within each of the plurality of processors, a timing sequence upon receipt of the floating interruption request, timing sequences of different durations being provided for different processors; and C. notifying, by one of the processors upon completion of the timing sequence for the processor, the interruption controller that the processor is ready to execute an interruption routine.

33. The method of claim 32 further comprising the steps of:

D. transferring, in response to the step of notifying, additional information for executing the interruption routine from the interruption controller to the processor; and E. executing, by the processor, the interruption routine.

34. The method of claim 32, further including the steps of:

cancelling the step of notifying by the processor in response to another of the plurality of processors notifying the interruption controller that it is ready to execute an interruption routine prior to the notification by the processor.

35. The method of claim 32, further including a step of inhibiting the step of notifying by the processor in response to an interruption mask.

36. The method of claim 32, further including a step of inhibiting the step of notifying by the processor in response the processor being busy.

37. The method of claim 32, wherein the step of notifying includes a step of asserting at least one control line coupled to each of the other of the plurality of processors to indicate that the processor has acknowledged the interruption request.

38. The method of claim 32, wherein the step of notifying includes a step of prioritizing the interruption request among at least one other interruption request.

39. A multiprocessor system comprising:

a common interrupt line for providing an interrupt signal;

a common interrupt acknowledgment line for providing a response to the interrupt signal; and a plurality of processors, each of the plurality of processors including:

a data processing unit; and an interrupt circuit, coupled to the data processing unit, the interrupt circuit having a first input that receives the interrupt signal on the common interrupt line, a first output that provides an internal interrupt to the processing element in response to the interrupt signal, a second input that receives an internal acknowledgment from the processing element indicative that the processing element is available, and an acknowledgment output that provides an acknowledgment signal on the common acknowledgment line in response to receiving the internal acknowledgment from the processing element only when none of the other of the plurality of processors have previously provided an acknowledgment signal on the common acknowledgment line in response to the interrupt signal on the common interrupt line.

40. The multiprocessor system of claim 39, wherein each interrupt circuit includes a delay circuit, having an input that receives the interrupt signal and an output that inhibits the acknowledgment output from providing the acknowledgment signal until a delay of time has passed.

41. The multiprocessor system of claim 40, wherein each interrupt circuit has a delay of time that is different from the other of the interrupt circuits.

42. The multiprocessor system of claim 40, wherein each interrupt circuit further includes a wait circuit, having an input indicative of whether the respective data processing unit is in a wait state, and an output that inhibits the acknowledgment output from providing the acknowledgment signal until the respective data processing unit is not in a wait state.

* * * * *